Oct. 17, 1950      F. R. PARKS      2,526,154
MEAT MASTICATOR
Filed July 13, 1946
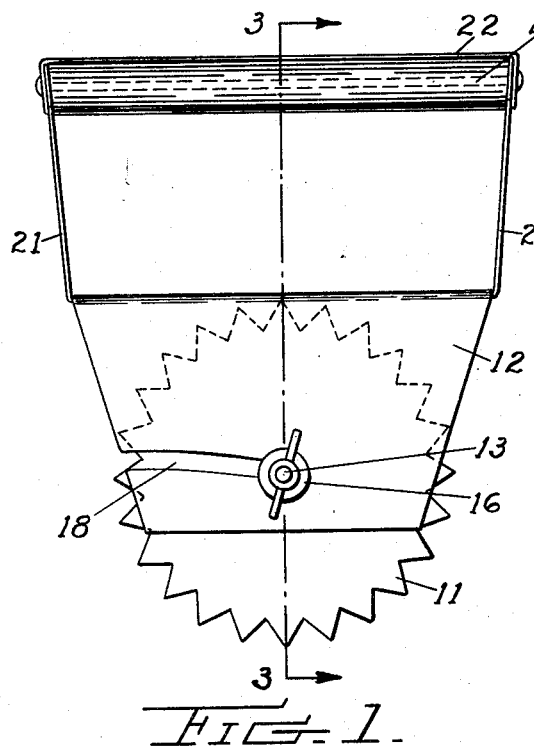
FIG. 1.
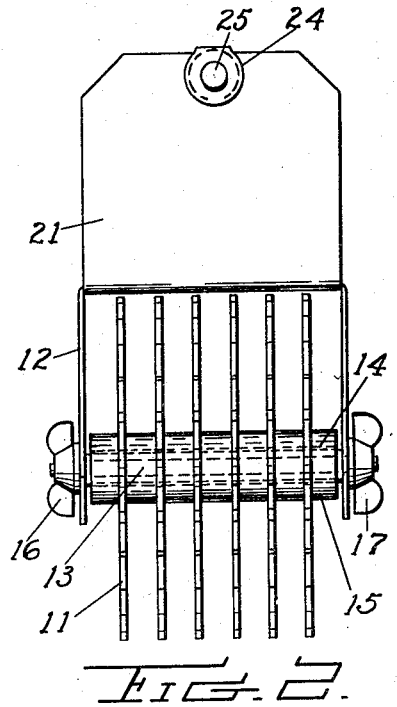
FIG. 2.
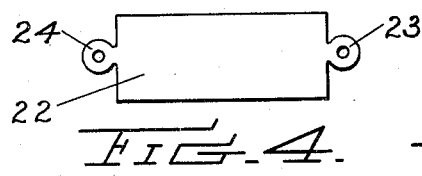
FIG. 4.
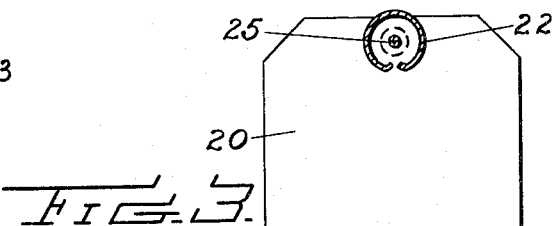
FIG. 3.
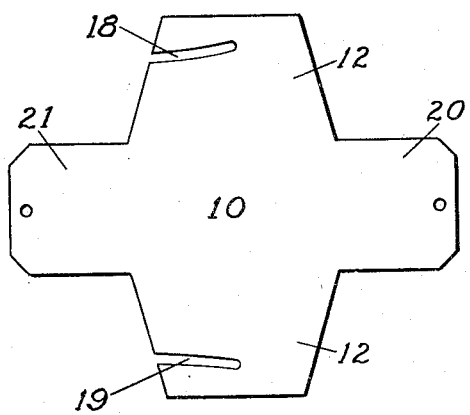
FIG. 5.
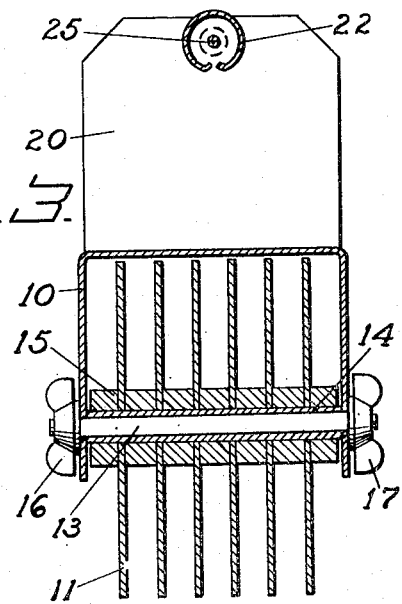
INVENTOR:
Fred R. Parks.
BY: Frank W. Dahn
ATTORNEY.

Patented Oct. 17, 1950

2,526,154

UNITED STATES PATENT OFFICE 2,526,154

MEAT MASTICATOR

Fred R. Parks, Fulton, N. Y.

Application July 13, 1946, Serial No. 683,476

1 Claim. (Cl. 17—29)

My invention relates to a meat masticator, intended particularly for use in tenderizing steak, though capable of use in other relations.

It is an object of the invention to provide a device of this character which is simple and inexpensive in construction and which can readily be taken apart as for cleaning or repair.

Another object of the invention is to provide an improved handle for the device.

Referring to the drawings, which are made a part of this application and in which similar reference characters indicate similar parts;

Figure 1 is a side elevation of the device;

Figure 2, a front elevation of the same;

Figure 3, a section on line 3—3 of Figure 1;

Figure 4, a detail of a blank forming part of the handle; and

Figure 5, a detail of a blank forming the casing for the cutting discs.

In the drawings, reference character 10 indicates the casing for the discs 11, said casing being formed by bending down the upper and lower arms 12—12 of the blank shown in Figure 5. A plurality of toothed discs 11 are arranged on a shaft 13 extending through the sides of casing 10, said shaft having a sleeve 14 surrounding it and said sleeve carrying a plurality of spacing collars 15, which are arranged respectively so as to separate the discs from one another and to separate the outer discs from the adjacent sides of the casing 10.

The parts are held together in the relation shown in the drawings by means of nuts 16, 17 threaded on the shaft 13, which shaft is stationary. The sleeve 14 may be clamped between the arms 20, 21 of the casing by nuts 16, 17 and the cutting discs 11 may rotate freely on the sleeve, said discs being spaced apart by the collars 15.

For convenient removal of the cutting discs, as is necessary for ready cleaning of the device, the arms 12—12 of the blank are provided with slots 18, 19. When the blank is bent as above described, the slots form means for guiding the shaft 13 and the parts carried thereby into the position illustrated in Figure 1 or out of engagement with the casing 10, the shaft 13 sliding in said slots. The length of the sleeve is such that when the nuts are tightened, they clamp the depending arms 12, 12 of the casing 10 against the ends of the sleeve so as to prevent accidental movement of the parts along the slots 18.

The upper part of the masticator is formed by bending upward the arms 20, 21 of the blank of Figure 5 into the position shown in other figures so as to bring the perforations therein into alignment. A sheet metal blank such as that shown in Figure 4 is bent into tubular shape and is inserted between the upwardly projecting arms 20, 21 and the ears 23, 24 at the ends of blank 22 of Figure 4 are bent down at the outer side of arms 12, 12, after which rod 25 is inserted through the alined perforations in arms 20, 21 and ears 23, 24, its ends being preferably headed over by riveting operations.

It is to be noted that the handle of the device extends parallel to the planes of the discs, so that by grasping the tool and tilting it in such manner as to cause the slots 18 to extend downward toward the work, the tool can be run back and forth over a piece of steak for example, to tender it, after which it can be run back and forth at an angle to the first cut and then the steak can be turned over and treated similarly on the other side, all without any danger of forcing the shaft 13 and parts carried thereby out of the slots 18.

It is to be understood that many changes may be made in my device, all without departing from the spirit of my invention. For instance, a wooden handle may be substituted for the sheet metal handle or other material may be used. Instead of toothed discs for masticating steak, I may use round discs with a sharp edge at the periphery, as for slicing and dicing vegetables. In general, the materials may be changed and the structure of parts may be changed, therefore I do not limit myself to what is shown in the drawings and described in the specification but only as indicated in the appended claim.

Having thus fully described my said invention, what I claim is:

A device of the character described, comprising a casing having parallel side portions, a shaft passing through said side portions of the casing, toothed cutting disks freely rotatable independently of each other about said shaft, spacers between said disks, a sleeve about said shaft supporting said disks and spacers said sleeve being constructed and arranged to engage the inner faces of said side portions, and nuts threaded on the ends of the shaft for clamping the shaft to the casing and sleeve when screwed toward the sleeve but leaving the cutting disks free to rotate on the sleeve, the side portions of the casing each having a slot of such dimensions as to receive the shaft only, the slots extending from an edge to a point approximately midway between their opposite side edges for receiving the ends of the shaft so that when the nuts are tightened, movement of the shaft along said slots is prevented.

FRED R. PARKS.

(References on following page)

REFERENCES CITED

The following references are of record in the file of this patent:

UNITED STATES PATENTS

| Number | Name | Date |
|---|---|---|
| 677,337 | Cameron | July 2, 1901 |
| 961,337 | Bretz | June 14, 1910 |
| 965,477 | Miller | July 26, 1910 |
| 1,589,208 | Mitchell | June 15, 1926 |
| 1,728,320 | Yarnall | Sept. 17, 1929 |
| 1,758,328 | Newsbaum | May 13, 1930 |
| 2,275,884 | Barker | Mar. 10, 1942 |

OTHER REFERENCES

The Boy Mechanic, 1924, Book 4, S. L., T. T. 160 B8, page 441.